United States Patent [19]

Marley et al.

[11] 4,004,091
[45] Jan. 18, 1977

[54] BIDIRECTIONAL LINE DRIVER

[75] Inventors: Robert Russell Marley, Phoenix; Paul Andrew Nygaard, Mesa; Walter Christian Seelbach, Scottsdale, all of Ariz.

[73] Assignee: Motorola, Inc., Chicago, Ill.

[22] Filed: June 26, 1975

[21] Appl. No.: 590,534

[52] U.S. Cl. ............................................... 178/70 R
[51] Int. Cl.² ........................................... H04L 25/20
[58] Field of Search ...... 340/346; 178/70 R, 70 TS, 178/71 R, 68, 66; 307/231, 235 R, 236, 241; 179/170 R

[56] References Cited
UNITED STATES PATENTS

| 2,937,236 | 5/1960 | Kundrotas | 178/70 TR |
| 3,179,747 | 4/1965 | Grace et al. | 178/70 R |

*Primary Examiner*—Thomas A. Robinson
*Attorney, Agent, or Firm*—Robert A. Farley

[57] ABSTRACT

A bidirectional line driver circuit for transmitting logic signals on a highly capacitive, or low impedance transmission line makes use of a tandem connection of switching means for providing a low impedance connection from the output of the driver circuit to either a first power supply voltage or a second power supply voltage to define transmitted logic levels. Coupled to the tandem switching means is a buffered feedback circuit which responds to conduction of the first switching means connected to the first power supply voltage such that nonconduction is produced in the second switching means connected to the second power supply voltage. A buffer transistor is incorporated in the feedback circuit to insure that this response occurs without significant loading of the output terminal thus eliminating the possibility of oscillation and providing for very high speed switching performance.

6 Claims, 2 Drawing Figures

BIDIRECTIONAL LINE DRIVER

BACKGROUND OF THE INVENTION

In digital systems, a common problem is the distribution of logic signals over relatively long distances. Electrically, this distribution of logic signals requires that a logic circuit be able to produce a signal having sharp rise and fall times with minimum transmission delay when working into a highly capacitive load. Thus, the requirement is that a transmitting logic circuit, commonly called a line driver, have a very low output impedance which will allow the rapid transfer of current to or from the capacitive load and thus minimize the rise and fall time of the transmitted logic signal. A line driver which has the capability of delivering current to the capacitive load and from the capacitive load so that both the rise time and the fall time of a propagated logic signal are controlled by the line driver's output impedance characteristic is called bidirectional since it drives current in both directions.

Several approaches have been taken in the various electrical circuits used to accomplish a bidirectional line driver function. One widely used approach is to use NPN transistors and PNP transistors in a tandem connection driving a common terminal. This type configuration has the advantage that the NPN transistor drives current in one direction and the PNP transistor drives current in the other direction to attain a bidirectional drive capability with relatively simple input circuitry. The major disadvantage with this approach is the fact that two different transistor types are required. In integrated circuit embodiments, it is very difficult to obtain NPN transistors and PNP transistors having optimized operating characteristics such as current gain at high frequencies within a single integrated circuit chip. Typically, in integrated circuits, NPN transistors with good high frequency performance are the easiest to fabricate and PNP transistors with reasonable high frequency performance can only be fabricated on the same integrated circuit chip by sacrificing the high frequency performance of the NPN transistors. Thus, a bidirectional line driver which can be implemented using only transistors of a single type, particularly NPN transistors, offers significant performance advantages.

SUMMARY OF THE INVENTION

Accordingly, it is an object of this invention to provide a bidirectional line driver circuit which uses all transistors of the same conductivity type and provides very high frequency performance.

It is a further object of this invention to provide a high performance bidirectional line driver circuit which has unity voltage gain, high current gain and low standby power.

It is a further object of this invention to provide a bidirectional line driver circuit capable of driving a high capacitance load with fast rise time and fast fall time logic signals.

It is a further object of this invention to provide a high performance bidirectional line driver circuit which utilizes internal feedback to provide a low standby power operation in response to logic inputs which are stabilized in a given logical state but which also provides dynamic feedback which aids high speed switching in response to a change in an input from one logical state to another.

It is a further object of this invention to provide a high performance bidirectional line driver circuit which uses a buffer transistor to provide isolation from the internal bias feedback network and the output load.

DETAILED DESCRIPTION

Figure 1:
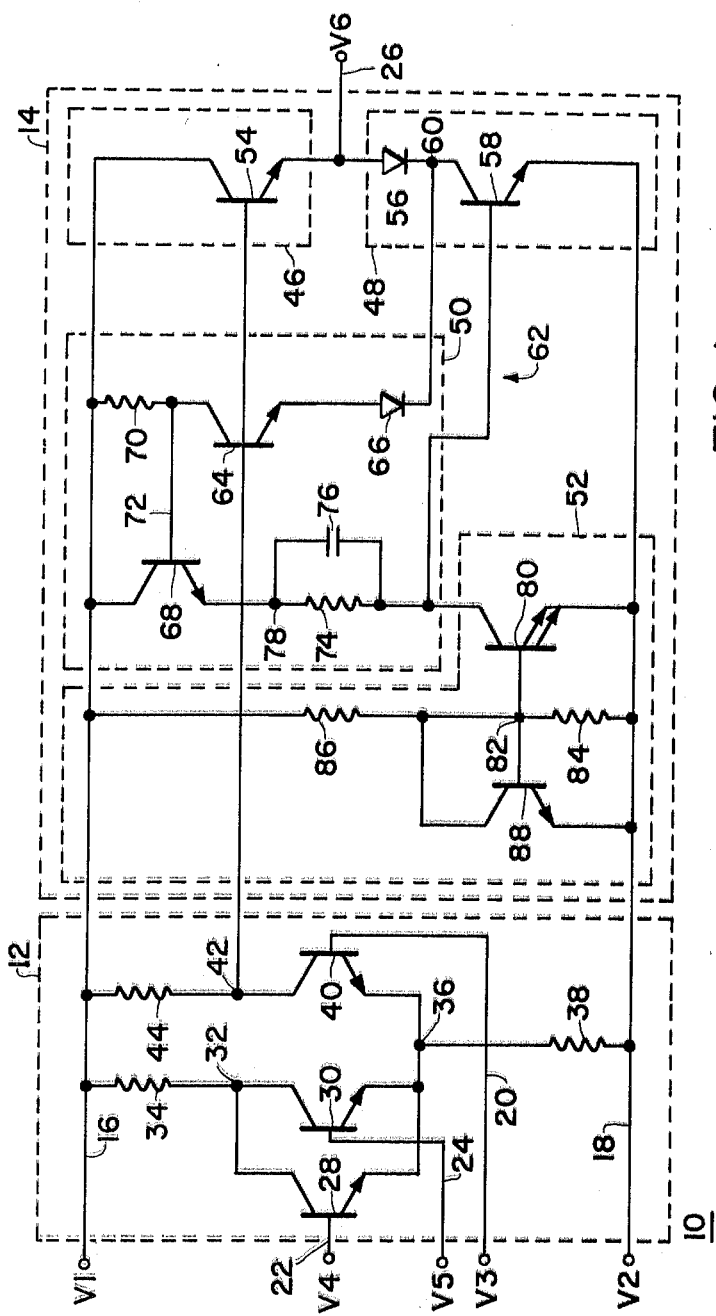
FIG. 1 shows an electrical schematic of the bidirectional line driver of the present invention.

FIG. 1 shows one particular embodiment of the present invention in which a bidirectional line driver circuit 10 comprises an input circuit 12 coupled to an output circuit 14. The input circuit 12 and the output circuit 14 couple to a first power supply voltage V1 via conductor 16 and to a second power supply voltage V2 via conductor 18. The input circuit 12 also couples to a reference power supply voltage V3 via conductor 20. The two input terminals V4 and V5 couple to the input circuit 12 via conductors 22 and 24, respectively. The output terminal V6 couples to the output circuit 14 via conductor 26.

The input circuit 12 comprises a differential amplifier stage which performs a logical NOR function of the input signals V4 and V5. Input V4 connects to the base of an input transistor 28 via conductor 22 and input V5 connects to the base of an input transistor 30 via conductor 24. The collectors of input transistor 28 and input transistor 30 connect to node 32 which connects one terminal of a resistor 34 whose other terminal connects to the V1 power supply via conductor 16. The emitters of input transistor 28 and input transistor 30 connect to node 36 which connects to one terminal of resistor 38 whose other terminal connects to the V2 power supply via conductor 18. Node 36 also connects to the emitter of reference transistor 40 whose base connects to the reference power supply V3 via conductor 20 and whose collector connects to node 42 which connects to one terminal of resistor 44 whose other terminal connects to the V1 power supply via conductor 16. Node 42 also provides a single ended output from the input circuit 12 for connection to the output circuit 14.

The output circuit 14 comprises a first output switching means 46 coupled to the first power supply conductor 16 and a second output switching means 48 coupled to the second power supply conductor 18, with both output switching means 46 and output switching means 48 coupled to the output terminal V6 via conductor 26. Output circuit 14 further comprises buffered feedback circuit 50 which couples to the first output switching means 46, the second output switching means 48, the first power supply conductor 16, a constant current circuit 52 and the input circuit 12. The output circuit 14 further comprises constant current source 52 which is coupled to the first power supply voltage V1 via conductor 16, the second power supply voltage V2 via conductor 18 and to the buffered feedback circuit 50.

Now reciting more detailed structure within the output circuit 14, the first output switching means 46 comprises transistor 54 which has a collector connected to first power supply conductor 16, a base coupled to the buffered feedback circuit 50 and to the input circuit 12 via conductor 42 and an emitter coupled to the output terminal V6 via conductor 26. The second output switching means 48 comprises a diode 56 and a transistor 58. The anode of diode 56 couples to the output terminal V6 via conductor 26. The cathode of diode 56 couples to the collector of transistor 58 and to the buffered feedback circuit 50 via conductor 60. The base of transistor 58 couples to the buffered feedback circuit 50 via conductor 62 and the emitter of transistor 58 couples to the second power supply voltage V2 via conductor 18.

The buffered feedback circuit 50 comprises a buffer transistor 64 whose base couples to the first output switching means 46 via conductor 42. The emitter of buffer transistor 64 couples to the anode of diode 66 whose cathode couples to the second output switching means via conductor 60. The collector of transistor 64 couples to the base of transistor 68 and one terminal of resistor 70 via conductor 72. The other terminal of resistor 70 connects to the first power supply voltage V1 via conductor 16. The base of transistor 64 also connects to the input circuit 12 via conductor 42. The collector of transistor 68 connects to the first power supply voltage V1 via conductor 16. The emitter of transistor 68 connects to one terminal of resistor 74 and capacitor 76 via conductor 78. The other terminals of resistor 74 and capacitor 76 connect to conductor 62 which connects to the second output switching means.

The constant current source 52 comprises multiple emitter transistor 80 whose collector couples to the buffered feedback circuit 50 via conductor 62. The multiple emitters of transistor 80 connect in common to the second power supply voltage V2 via conductor 18. The base of transistor 80 connects to node 82 which connects to one terminal of resistor 84, one terminal of resistor 86 and the base and collector of current reference transistor 88. The emitter of current reference transistor 88 connects to the second power supply voltage V2 via conductor 18. The second terminal of resistor 84 connects to the second power supply voltage V2 via conductor 18. The second terminal of resistor 86 connects to the first power supply voltage via conductor 16.

Figure 2:
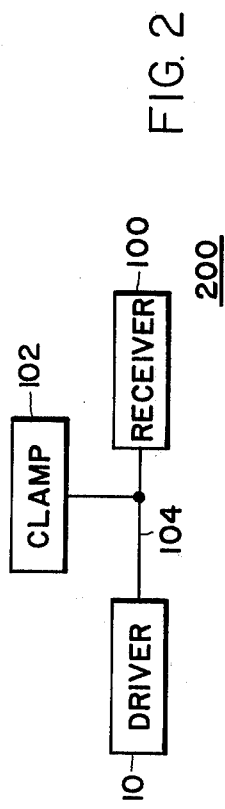
FIG. 2 shows a system schematic in which the bidirectional line driver of the present invention is used in conjunction with a line receiver and a clamp circuit.

FIG. 2 shows a system configuration 200 which makes use of the bidirectional line driver 10 of the present invention. The system configuration comprises a bidirectional line driver 10 which couples to a line receiver 100 and a clamp circuit 102 via conductor 104.

MODE OF OPERATION

The operation of the particular embodiment of the bidirectional line driver circuit of the present invention shown in FIG. 1 is understood by first considering the operation of the input circuit 12. The input circuit 12 is the differential amplifier stage of a conventional ECL gate which performs a NOR function of the input signals V4 and V5. The circuit is connected between a first power supply voltage V1 (typically 0 volts), a second power supply voltage V2 (typically −5.2 volts) and an input reference power supply voltage V3 (typically −1.30 volts). The input logic signals applied to inputs V4 and V5 typically vary from a low level of −1.75 volts to a high level of −0.9 volts. The differential amplifier action of the input circuit is conventional. When input signal V4 or input signal V5 is at the high level of 0.9 volts, a voltage greater than the reference voltage V3, the transistor 40 will be operating very close to the cut-off state resulting in a voltage of about −0.05 volts at node 42. This voltage at node 42 is coupled to the base terminals of transistor 64 and 54 with the result that an output logic signal V6 of −0.9 volts is produced. Similarly, when both input signals V4 and V5 are at the low level of −1.75 volts, the resulting nonconduction of transistors 28 and 30 results in the conduction of transistor 40 such that the voltage at node 42 is about −0.90 volts and the output logic signal V6 is at the low level of −1.75 volts. Thus, the line driver circuit 10 of FIG. 1 operates to transmit logic level signals with unity voltage gain so that there is no voltage expansion or contraction of the logic signal in passing through the circuit.

The bidirectional line driver circuit 10 contains a buffered feedback circuit 50 which is arranged to operate in conjunction with the constant current source 52 such that output driver transistors 54 and 58 operate with a low value of "standby" current as far as DC operation is concerned. This standby current establishes a quiescent operating point for transistors 54 and 58 which allows for rapid switching in response to input logic signals while still maintaining low standby power dissipation. The buffered feedback circuit 50 is arranged to provide for the operation of transistors 54 and 58 at a prescribed standby current value independent of the logic level present at the output terminal 26. This requirement is fulfilled by an arrangement of counter balancing voltages present within the circuit. These voltages are the voltage developed across resistor 70, the base emitter voltage of transistor 68, the voltage developed across resistor 74, and the base emitter voltage of transistor 58. The sum of these voltages must always equal the voltage difference between the first power supply voltage V1 and the second power supply voltage V2. Because the value of resistor 70 is fixed, the voltage across resistor 70 establishes a predetermined value of current which then must flow as the collector current in transistor 64 since the current flow into the base of transistor 68 can be neglected. Transistor 64 and transistor 54 have essentially the same applied base emitter voltage since conductor 42 connects to both bases and the voltage develolped across diode 66 and diode 56 will be equal. Thus, the standby current flowing in transistor 54 will be a scaled replica of the standby current flowing in transistor 64 with the relative emitter junction areas of transistors 64 and transistor 54 determining the scaling factor. These standby currents are summed at node 60 and then flow as collector current in transistor 58 to form the standby current for transistor 58. Thus, the standby current in transistors 54 and 58 are directly related to the current flow in resistor 70 which in turn is determined by the value of constant current source 52 which sets the current in resistor 74 and thus the voltage drop across it. It is thus seen that the standby current values present in transistors 54 and 58 remain at their predetermined value independent of the voltage of the logic signal applied at the input and thus are maintained in a fast switching preconductive mode for logic signal transitions in either direction.

Constant current source 52 uses well known design techniques wherein the base emitter voltage of a reference transistor 88 is by definition the same as the base emitter voltage of a current source transistor 80 so that the current flowing in each emitter of the multiple emitter transistor 80 must be identical with the emitter current of reference transistor 88. This relationship allows scaling of the current source equivalent value of transistor 80 by appropriate scaling of emitter sizes. The relationship also allows the current source value to have temperature and power supply voltage dependencies which in turn allows suitable selection of the voltage developed across resistor 70. In the preferred embodiment, the current source value would be chosen to make the temperature coefficient of the voltage across resistor 70 proportional to the temperature coefficient of an emitter based junction thus compensating the operation of the circuit over temperature to eliminate possible saturation of transistor 64.

In terms of dynamic performance, the bidirectional line driver circuit 10 operates such that transistor 54 is driven into deep conduction to pull the V6 logic output to the logical high state whereas, transistor 58 is driven into deep conduction to pull the output V6 to the logical low state. One unique feature of the present invention is the advantages offered by the dynamic feedback of the buffered feedback circuit 50. This dynamic feedback provides that when a low to high voltage transition occurs at node 42 to force output transistor 54 into a high conducting state, the dynamic feedback of circuit 50 produces a voltage change at node 62 which drives output transistor 58 towards cutoff thus reducing the current load on transistor 54 and enhancing its ability to drive the load connected to terminal V6. Conversely, when a high to low transition occurs at node 42, transistors 54 and 64 are rapidly switched from deep conduction towards cutoff. This results in a step function decrease in the collector current of transistor 64 causing a rapid low to high voltage transition at node 72. This results in a rapid increase in conduction in transistor 68 causing a low to high voltage transition at node 78 which is then coupled via resistor 74 and capacitor 76 to node 62 which connects to the base of output switching transistor 58. Capacitor 76 provides a low impedance coupling network which allows the propagation of the voltage transition at node 78 to the base of transistor 58 with minimum delay. Thus, the operation of the feedback circuit 50 provides that a logic high to logic low transition at node 42 causes transistor 54 to become nonconducting and simultaneously transistor 58 to become conducting such that a high speed logic high to logic low transition appears at the output terminal 26. Because of the low impedance characteristics of the output switching transistors 54 and 58, the high speed logic low to logic high or logic high to logic low transitions can be reproduced at output terminal 26 even if the load connected to output terminal 26 is highly capacitive.

What is claimed is:

1. A bidirectional line driver circuit comprising:
   a. input circuit means, said input circuit means having an output node and said input circuit means responsive to an input logic signal;
   b. first output switching means comprising a first transistor having an emitter electrode coupled to the line driver output terminal, a collector electrode coupled to a first power supply conductor, and a base electrode coupled to said output node;
   c. second output switching means coupled to a second power supply conductor and coupled to said line driver output terminal;
   d. buffered feedback means coupled to said input circuit and coupled to said first output switching means via said output node and coupled to said second output switching means, said buffered feedback means responding to conduction of said first output switching means to effect nonconduction in said second output switching means and responding to nonconduction of said first output switching means to effect conduction in said second output switching means at high speeds in response to a signal transition at said logic input of said input circuit, wherein said buffered feedback means comprises a buffer transistor, said buffer transistor operating in response to the conduction of said first output switching means for providing a conduction replica of said conductive state of said first switching means without loading said line driver output terminal; and
   e. constant current source means coupled to said first power supply conductor and to said second power supply conductor and coupled to said buffered feedback means.

2. The bidirectional line driver circuit recited in claim 1 wherein said second switching means comprises a second transistor having a collector electrode coupled to said line driver output terminal, an emitter electrode coupled to said second power supply conductor, and a base electrode coupled to said buffered feedback means.

3. The bidirectional line driver circuit recited in claim 2 wherein said buffered feedback means comprises a first resistor having a first terminal coupled to said first power supply conductor and having a second terminal coupled to the collector electrode of said buffer transistor, the voltage developed across said first resistor providing a measure of the quiescent current in said first switching transistor and said second transistor during nonswitching intervals of operation.

4. The bidirectional line driver circuit recited in claim 3 wherein said buffered feedback circuit comprises a first feedback transistor having a collector electrode coupled to said first power supply conductor, a base electrode coupled to said second terminal of said first resistor, and an emitter electrode coupled to the first terminal of a second resistor, said second resistor having a second terminal coupled to said constant current source and to said second output switching means, said first feedback transistor electrically linking the voltage across said first resistor and the voltage across said second resistor, said electrical linking providing circuit operation for stabilizing the quiescent operating points of said first switching means and said second switching means against variation in temperature or power supply voltage.

5. The bidirectional line driver circuit recited in claim 4 wherein all of said transistors are of the same conductivity type.

6. A bidirectional line driver circuit comprising:
   a. a first power supply conductor;
   b. a second power supply conductor;
   c. input means coupled to the first power supply conductor and the second power supply conductor, said input means having an output terminal;
   d. a first transistor having a collector coupled to the first power supply conductor, a base coupled to the output terminal of the said input means and an emitter coupled to a line driver output terminal;
   e. a first diode having an anode coupled to the line driver output terminal and having a cathode;
   f. a second transistor having a collector coupled to the cathode of the first diode and an emitter coupled to the second power supply conductor and a base;

g. a first resistor having a first terminal coupled to the first power supply conductor and having a second terminal;
h. a third transistor having a collector coupled to the second terminal of the first resistor, a base coupled to the base of the first transistor and an emitter;
i. a second diode having an anode coupled to the emitter of the third transistor and a cathode coupled to the collector of the second transistor;
j. a fourth transistor having a collector coupled to the first power supply conductor, a base coupled to the collector of the third transistor and an emitter;
k. a second resistor having a first terminal coupled to the emitter of the fourth transistor and a second terminal coupled to the base of the second transistor;
l. a constant current circuit coupled to the first power supply conductor and coupled to a second power supply conductor and having a first output terminal coupled to the base of the second transistor;
m. a capacitor having a first terminal coupled to the first terminal of the second resistor and a second terminal coupled to the second terminal of the second resistor;
n. said first, second, third and fourth transistors all being of the same conductivity type.

* * * * *